United States Patent [19]

Wahl et al.

[11] 4,408,327
[45] Oct. 4, 1983

[54] METHOD AND CIRCUIT FOR SYNCHRONIZATION

[75] Inventors: Helmut Wahl, Weissach; Hagen Hofmeister, Korb, both of Fed. Rep. of Germany

[73] Assignee: Licentia Patent-Verwaltungs-GmbH, Frankfurt am Main, Fed. Rep. of Germany

[21] Appl. No.: 188,991

[22] Filed: Sep. 22, 1980

[30] Foreign Application Priority Data

Sep. 21, 1979 [DE] Fed. Rep. of Germany ....... 2938228

[51] Int. Cl.³ .......................... G06F 1/04; G06F 9/00; H03K 5/13; G05B 19/02
[52] U.S. Cl. ..................... 371/47; 364/200; 375/111
[58] Field of Search ............... 375/106, 107, 108, 110, 375/111, 112, 113, 114, 118, 20; 370/100, 109; 371/42, 46, 47; 364/200 MS File, 900 MS File

[56] References Cited

U.S. PATENT DOCUMENTS

| | | | |
|---|---|---|---|
| 3,472,961 | 10/1969 | Wheeler et al. | 375/108 |
| 3,602,900 | 8/1971 | Viroflay et al. | 364/200 |
| 3,612,906 | 10/1971 | Kennedy | 375/110 |
| 3,866,184 | 2/1975 | Buhrke et al. | 364/200 |
| 3,936,604 | 2/1976 | Pommerening | 375/111 |
| 3,961,311 | 6/1976 | Pavoni et al. | 371/42 |
| 3,989,894 | 11/1976 | Charransol et al. | 364/900 |
| 4,087,627 | 5/1978 | Sato et al. | 375/110 |
| 4,196,416 | 4/1980 | Stein | 375/111 |
| 4,208,724 | 6/1980 | Rattlingourd | 364/900 |
| 4,302,831 | 11/1981 | Zemanek | 375/111 |

*Primary Examiner*—Joseph F. Ruggiero
*Assistant Examiner*—Gary V. Harkcom
*Attorney, Agent, or Firm*—Spencer & Kaye

[57] ABSTRACT

A method for synchronizing switching mechanisms or program sequences to an external frame clock pulse, wherein after a given period of time the switching mechanism or program is enabled to be reset and that after this enabling the resetting takes place with the edge of an external clock pulse. Moreover, the resetting takes place immediately after enabling if the edge of the external clock pulse has appeared earlier in time and the resetting takes place in any case no later than after a further given period of time even if the edge of the external clock pulse has not arrived. An apparatus for carrying out the method is also disclosed.

7 Claims, 2 Drawing Figures

METHOD AND CIRCUIT FOR SYNCHRONIZATION

BACKGROUND OF THE INVENTION

The present invention relates to a method and a circuit arrangement for synchronizing switching mechanisms or program sequences with an external frame clock pulse.

When designing, for example, modern data transmission devices the modulators are increasingly designed as purely digital circuits. These circuits operate with fixed switching cycles and must be able to be synchronized with an external clock pulse when required.

German Pat. No. 1,287,609 discloses a method for stepwise synchronizing synchronous transmission systems where, depending on requirements, a higher clock pulse frequency, no clock pulse frequency or a lower clock pulse frequency is fed to the input of a divider chain and the desired clock pulse appears at the output of the divider chain. This method can be realized only with complicated circuitry.

SUMMARY OF THE INVENTION

It is the object of the present invention to provide a method for synchronizing switching mechanisms or computer programs with an external clock pulse which method can be realized at little expense and wherein the resulting jitter can be kept lower than has previously been possible.

The above object is achieved according to the method of the invention in that in a method for synchronizing switching mechanisms or program sequences to an external frame clock pulse, the switching mechanism or program is enabled to be reset after a given period of time, and after enabling, the external clock pulse is detected and the switching mechanism or program is reset (a) upon the appearance of the edge of the external clock pulse, (b) immediately after enabling if the edge of the external clock pulse has appeared earlier in time, or (c) no later than after a further period of time if the edge of the external clock pulse has not been detected by the end of this further period of time.

A preferred embodiment of an apparatus for accomplishing the above object and carrying out the above described method includes: an oscillator having its output connected to the input of a frequency divider chain with the output of the divider chain forming the clock pulse which is to be synchronized to the external clock pulse; a first decoder means having its input connected to the divider chain for producing an output pulse whenever the divider chain reaches a predetermined state; a second decoder means having its input connected to the divider chain for producing an output pulse whenever the divider chain reaches a second predetermined state after the first predetermined state; a memory having its input connected to the output of the first decoder means and its output connected to the enabling input of an AND circuit to whose other input is applied the external clock pulse; and an OR circuit having a first input connected to the output of the AND circuit, a second input connected to the output of the second decoder means, and an output connected to a reset input of the divider chain and to an erase input of the memory. Preferably the inputs of the first and second decoder means are each connected to the output of the divider chain.

DETAILED DESCRIPTION OF THE PREFERRED EMBODIMENTS

The method according to the invention is based on the fact that the cycle to be performed by the switching mechanism or program is somewhat shorter in time than the duration of the external clock pulse. If the program to be performed or the switching cycle has a fixed length in time, this length can be obtained as a reference value. With variable lengths, however, a special counter must provide a time base.

The solution, according to the invention, of the problem mentioned above is that a "window" is produced. If the external clock pulse edge to be synchronized appears in time before this window, the leading edge of the window is used for synchronization. If the external clock pulse edge appears during the window, the synchronization is made with just this edge. If, however, this edge of the external clock pulse arrives later than the trailing edge of the window or if it does not come at all, the synchronization is made at the latest with the trailing edge of the window. The synchronization process consists in that at the end of the switching cycle the switching mechanism takes on rest position and the synchronizing pulse sets it to its starting position. If a program is involved, a waiting loop or a limited time waiting cycle is run at the end of the respective program section or at the end of the entire program.

One embodiment of the method according to the invention provides, for example, that in a program or switching cycle of fixed length in time, from the time $\tau$ before the point in time at which the external synchronizing clock pulse edge is expected to a time after this point in time at which the external clock pulse edge is expected, this external clock pulse is searched for and the program or switching cycle is restarted when the clock pulse has taken on a certain logic level. Alternatively, the occurrence of the clock pulse edge can be stored and the memory contents can be read out and erased.

Figure 1:
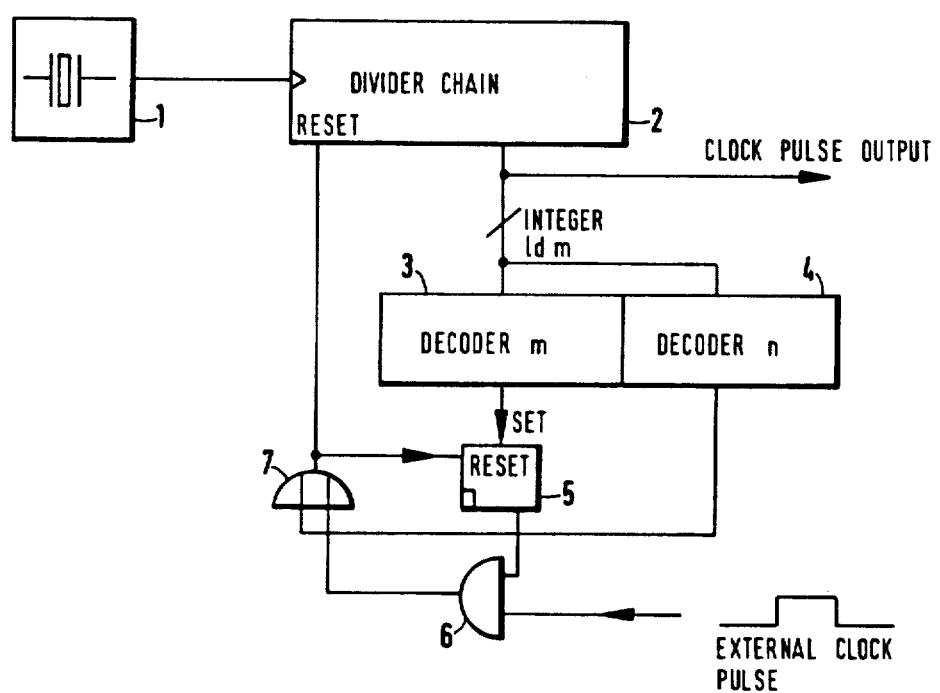
FIG. 1 is a block circuit diagram of a preferred embodiment of the apparatus according to the invention for carrying out the method according to the invention.

Referring now to FIG. 1, the output pulses provided by a quartz oscillator or generator 1 are fed to the input of a binary counter or divider chain 2 whose output comprises the internal clock pulse output of the circuit that is to be synchronized to an external clock pulse. The output of the divider chain 2 is likewise fed to the input of the decoder 3 and to the input of a further decoder 4. The decoder 3 is responsive to the output signals from divider chain 2 to produce an output pulse as soon as the divider chain 2 reaches a predetermined position or state m while the decoder 4 produces an output pulse whenever the divider chain reaches a further predetermined position or state n which occurs a predetermined period of time after the divider chain 2 reaches state m. The time between the divider chain reaching states m and n thus provides the desired window.

Each decoder 3 and 4 is connected to a given plurality of the stages of the divider chain 2 and directly determines the given states (decoder 3 determines state m, decoder 4 determines state n). The decoders therefore have to be connected to a number of integer logarithm dualis m as indicated in FIG. 1.

The decoders 3 and 4 are simple decoders to detect a given state of a counter.

The output pulse from the decoder 3 is fed to the set input of a flip-flop 5, which acts as a memory for the output pulse from decoder 3. The output of the memory 5, i.e. the set output of the flip-flop, is fed to one input of an AND circuit 6 so as to enable same whenever the memory 5 is in its set condition. The other input of the AND circuit receives the external clock pulse and the output of the AND circuit is connected to one input of an OR circuit 7, whose other input is connected to the output of decoder 4 and whose output is connected to the reset input of the divider chain 2 and to the reset or erase input of memory flip-flop 5.

With the memory 5 in the set condition, and consequently with the AND circuit 6 enabled, when the leading edge of the external clock pulse appears at the other input of the AND circuit 6, or if the external clock pulse at the other input of AND circuit 6 is already in the logic "1" condition, the AND circuit 6 will produce an output signal causing the OR circuit 7 to produce an output signal and reset the divider chain 2 to its starting position so as to synchronize the clock pulse produced by the divider chain 2 with the external clock pulse. The output signal from the OR circuit 7 will also reset the memory flip-flop 5.

If during a predetermined period of time after enabling of AND circuit 6, no external clock pulse appears at the associated input of AND circuit 6 or if during this predetermined period of time the external clock pulse is not in the logic "1" condition, the divider chain 2 will reach its n state or position. This is detected by the decoder 4 which then produces an output pulse which is fed, via OR circuit 7, to the reset input of divider chain 2 to reset same to its starting position and to the reset input of memory flip-flop 5.

The synchronizing unit as described in FIG. 1 now delivers a clock pulse at its clock pulse output which is synchronized to the external clock pulse but with less jitter. This clock could now be used to restart a switching or program cycle. This switching or program cycle should be finished in a shorter time than the time interval of the synchronized clock pulses and should then wait for the corresponding next clock pulse edge to restart the cycle.

Figure 2:
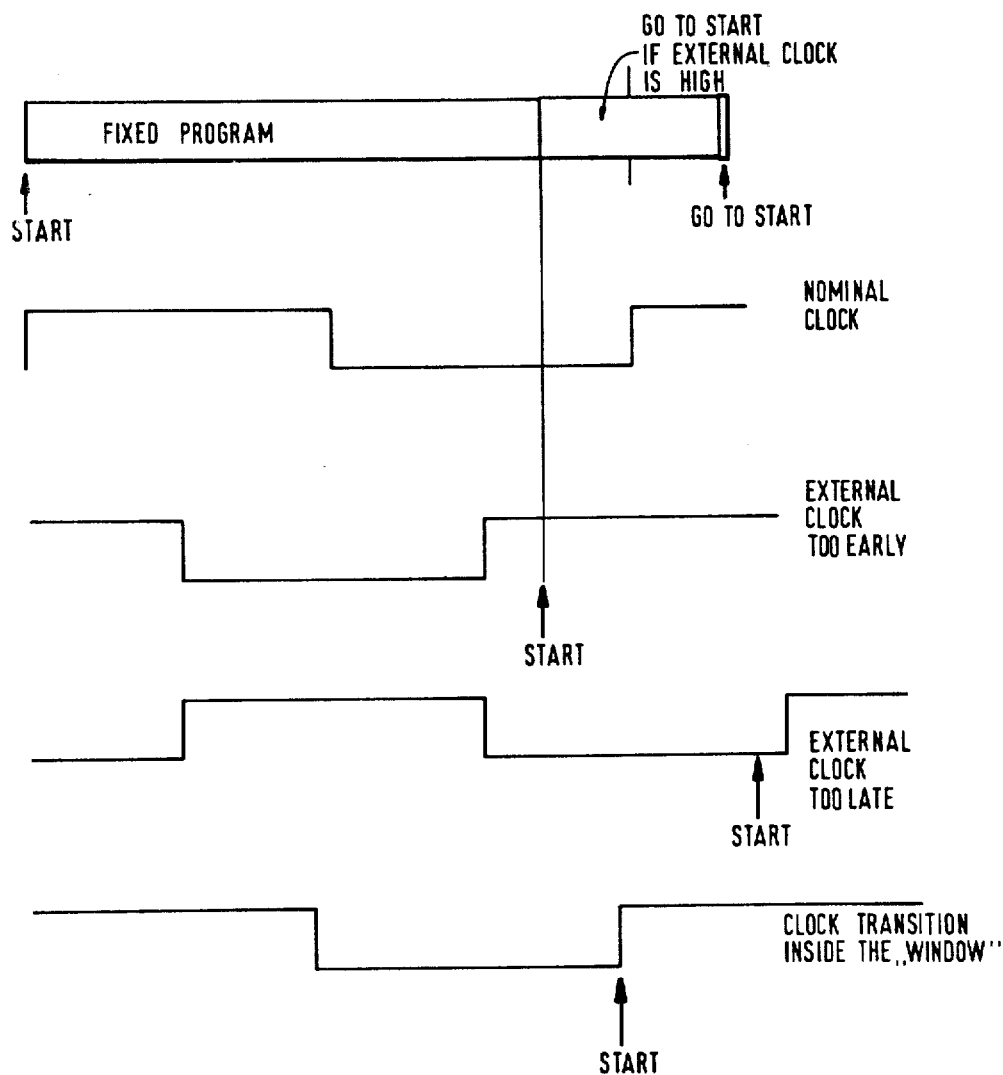
FIG. 2 shows a pulse diagram of the possible external frame clock pulse referred to a program sequence.

If this cycle has a fixed length, then it is not mandatory to use a divider chain to synchronize onto an external clock pulse. With, for example, a program cycle with fixed length which is slightly shorter than the mean length of the external clock, one could have, after the fixed program length, a waiting cycle which searches for the external clock pulse to be high and goes back to start if the external clock is found to be high or restarts at latest after a certain time with a command "Go to start". This is shown in FIG. 2.

It is to be understood that the above description of the present invention is susceptible to various modifications, changes and adaptations, and the same are intended to be comprehended within the meaning and range of equivalents of the appended claims.

What is claimed is:

1. A method for synchronizing switching mechanisms or program sequences to an external frame clock pulse comprising the steps of:
   after a given period of time sufficient for the switching mechanism or program sequences to have completed one cycle of operation, enabling the switching mechanism or program to be restarted; and
   after enabling, immediately generating an internal clock pulse for the restarting of the switching mechanism or program upon (a) the appearance of the leading edge of the external clock pulse within a further given period of time, (b) the detection of the presence of the external clock pulse at the time of enabling indicating that the leading edge of the external clock pulse has appeared earlier in time, or (c) the termination of said further given period of time if the leading edge of the external clock pulse has not been detected by the end of this further given period of time.

2. The method defined in claim 1 wherein the duration of said external clock pulse is longer than the time required for said switching mechanism or program sequence to complete one cycle of operation.

3. An apparatus for synchronizing a switching mechanism or a program sequence to an external frame clock pulse whose duration is longer than the time required for said switching mechanism or program sequence to complete one cycle of operation comprising:
   an oscillator having its output connected to the input of a frequency divider chain having an output for providing an internal frame clock pulse for the switching mechanism or program sequence;
   a first decoder means having its input connected to said divider chain for producing an output pulse whenever said divider chain reaches a first predetermined state corresponding to said time required for the switching mechanism or program sequence to complete one cycle of operation;
   a second decoder means having its input connected to said divider chain for producing an output pulse whenever said divider chain reaches a second predetermined state after said first predetermined state;
   a memory having its input connected to the output of said first decoder means and its output connected to the enabling input of an AND circuit to whose other input is applied the external clock pulse; and
   an OR circuit having a first input connected to the output of said AND circuit, a second input connected to the output of said second decoder means and its output connected to a reset input of said divider chain and to an erase input of said memory; whereby an internal frame clock pulse is produced immediately upon detection of the external clock pulse during the time period between said first and second predetermined states or upon reaching said second predetermined state without the detection of an external frame clock pulse.

4. Apparatus as defined in claim 3 wherein said inputs of said first and second decoder means are each connected to said output of said divider chain.

5. Apparatus as defined in claim 3 wherein said memory is a flip-flop and wherein said erase input is the reset input of said flip-flop.

6. Method for synchronizing switching mechanisms or program sequences in data transmission devices with an external frame clock pulse subject to fluctuations within a given tolerance range, comprising gradually matching the leading edge of a generated internal frame clock pulse for the switching mechanism or program sequence with the leading edge of the external frame clock pulse arriving at changing points in time by:

(a) generating the internal frame clock pulse in synchronism with the leading edge of the external frame clock pulse if the leading edge of the external clock pulse appears during a fixed time period corresponding to said tolerance range;

(b) generating the internal frame clock pulse in synchronism with the leading edge of said fixed time period if the leading edge of the external frame clock pulse has appeared prior to said fixed time period; and (c) generating the internal frame clock pulse in synchronism with the trailing edge of said fixed time period if the leading edge of the external frame clock pulse appears after said fixed time period.

7. The method defined in claim 6 wherein the duration of said external frame clock pulse is longer than the time required for the switching mechanism or program sequence to complete one cycle of operation.

* * * * *